George B. Wepsala  Inventor

By W. D. T Heilman  Attorney

George B. Wepsala  Inventor

By W. O. T. Heilman  Attorney

George B. Wepsala    Inventor

George B. Wepsala  Inventor

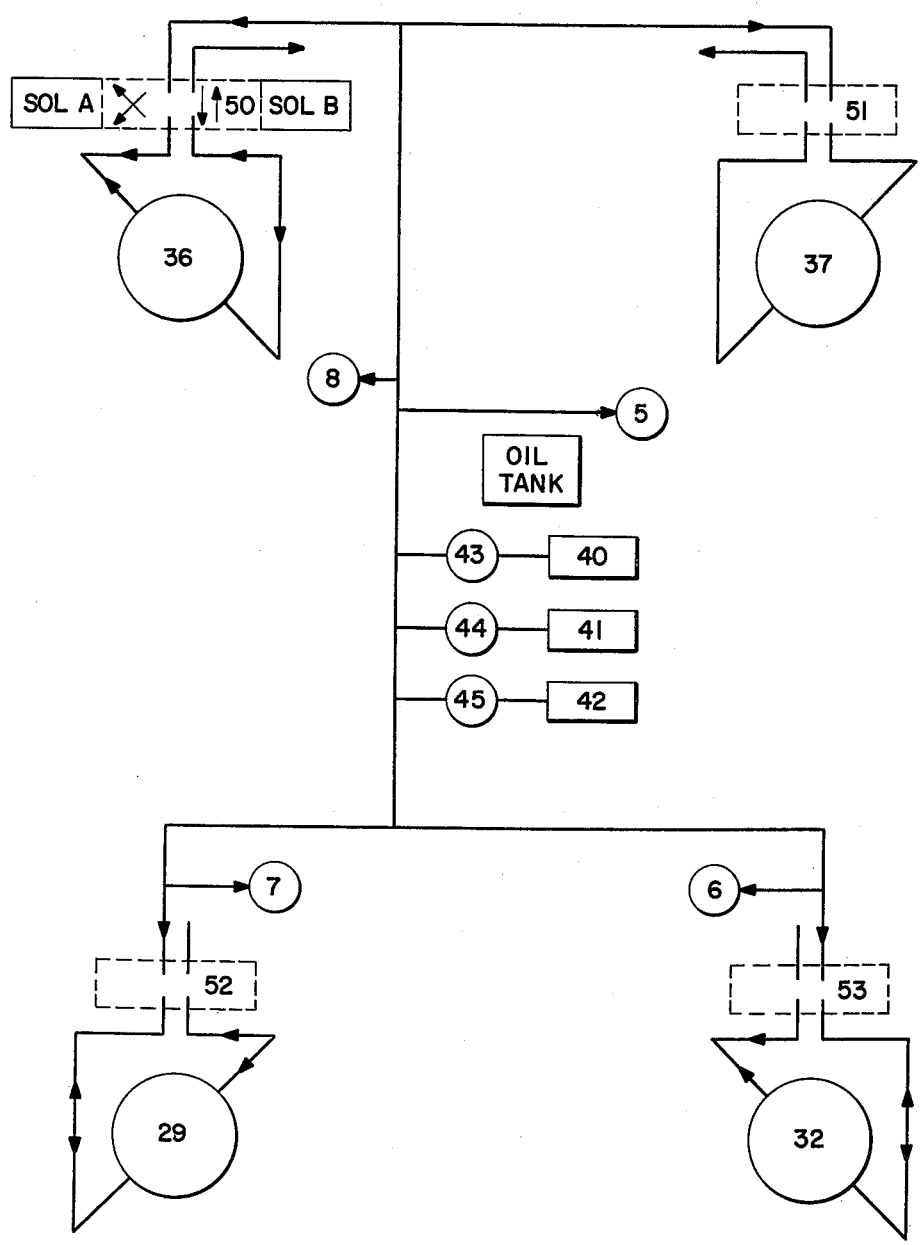

United States Patent Office 3,078,680
Patented Feb. 26, 1963

3,078,680
FLOATING RIG MOVER
George B. Wepsala, Irvington on Hudson, N.Y., assignor to Jersey Production Research Company, a corporation of Delaware
Filed Dec. 15, 1958, Ser. No. 780,613
8 Claims. (Cl. 61—46.5)

The present invention is generally concerned with an improved apparatus for the moving and positioning of drilling rigs in marine locations. The invention is especially concerned with an apparatus and method for drilling oil wells in marine locations and submerged lands. The invention is particularly directed toward an apparatus and method for transporting a complete drilling rig including the substructure, the derrick, the draw-works and auxiliary equipment as a single unit from one marine location to another marine location.

It is well known in the art to position drilling rigs on barges as an integral part of the barge and to utilize the barge as a drilling base during the drilling of the borehole into the earth's substrata in marine locations. However, this method is relatively expensive, time consuming and very cumbersome to operate. Another method known in the art is to erect permanent foundations above the water and to position thereon the complete drilling rig which can be disassembled after the borehole has been completed. Upon completion of the borehole, this particular type of rig is disassembled, placed upon suitable marine transportation and transported to a new location. The rig is then assembled in the new location. This method is very time consuming and expensive.

The method of the present invention comprises moving a complete, unitized drilling rig from one foundation to another foundation by supporting the rig in a unique and effective manner, utilizing a novel marine transportation apparatus. The rig moving apparatus of the present invention comprises an integrated apparatus consisting, in essence, of a pair of self-motivated pontoons, said pontoons having as an integral part thereof, hydraulic jacks adapted to elevate and lower a yoke assembly which, in turn, is adapted to elevate and lower a rig substructure. The rig substructure is designed to support the derrick, the draw-works and auxiliary equipment as a single unit.

The advantages of the present apparatus and process are that rig-up and rig-down-time is eliminated during the moving operation. Furthermore, no additional crane barges or other floating equipment are required. In addition, the rig is much more efficient since it does not have to be designed to be easily assembled and disassembled.

In the art of drilling boreholes into the earth's substrata, many marine drilling operations are carried out at depths from about 20 to 100, to 500 and greater feet below the surface of the water. Wells in these marine locations are dug or drilled to a depth of from 5,000 to 10,000 feet and greater. In order to accomplish this, it is customary to fabricate and position a suitable marine foundation upon which the rig can be erected for the handling of the drilling pipe necessary for drilling the borehole and for conducting the various well completion operations.

These permanent foundations upon which the rig is placed are constructed by various methods. One method, for example, is to drive concrete piling into the substrata of the lake or ocean bottom and thereafter to form a platform 20 to 40 feet above the surface of the water. As pointed out above, the derrick and other rig equipment are then positioned on the platform for the drilling of the borehole and for the completion of the well. These rigs vary greatly in weight as, for example, from about 150 to 200 tons. Also wells may be drilled and completed at various rates as, for example, one about every 20 to 40 days etc. Thus, after well completion, there exists at the present time only two alternates, namely, to leave the rig intact on the foundation and to be dismantled at a later date, or to go through the expensive procedure of disassembling the rig, transporting it to a new location and then reassembling the rig. If this latter procedure be followed on numerous occasions, it is necessary to rework or clean out an existing well. Thus, it is then necessary to reassemble the rig for the reworking of the original well and then after completion of the reworking to again disassemble the rig including the derrick.

The present invention is directly concerned with an efficient procedure and method for the movement of rigs from one marine location to another as required either for the drilling of a new borehole or for the reworking of a previously drilled well. The process and apparatus of the present invention may be readily understood by reference to the drawings illustrating embodiments of the same.

Referring specifically to the drawings.

Figure 1:
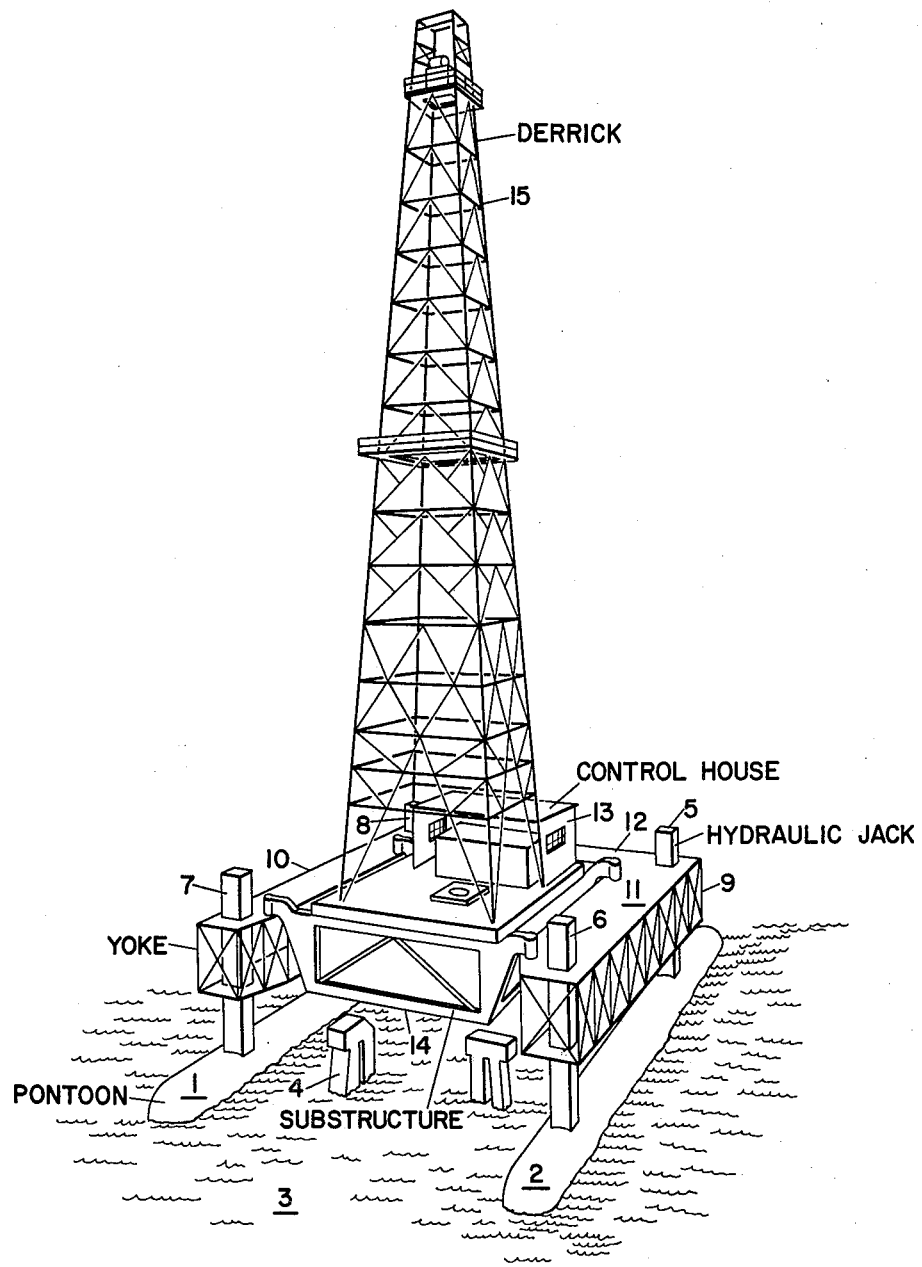
FIG. 1 illustrates the essential elements of the apparatus with respect to their relationship one to another.

Referring specifically to FIGURE 1, illustrating the essential elements of the apparatus with respect to their relationship one to another, pontoons 1 and 2 are shown in parallel relationship floating on a water body 3 about a marine platform 4. The marine platform as shown comprises four concrete pilings extending from within the earth below the aqueous body to a point above the surface of the water. It is understood this platform can be modified appreciably. Extending vertically upward from the pontoons and comprising an integral part thereof are hydraulic jacks 5, 6, 7 and 8.

Adapted to be raised on said jacks is a yoke assembly 9 consisting of two leg elements 10 and 11 and a midsection element 12. Leg elements 10 and 11 are in parallel relationship with respect to pontoons 1 and 2 while midsection 12 is in a perpendicular relationship to pontoons 1 and 2. In combination with said pontoons and said yoke is a detachable substructure 14 which is designed to be picked up from said platform 4 or to be lowered onto said platform. Substructure 14 is designed to support a derrick 15, a control house 13 and other necessary auxiliary equipment for the drilling of a borehole such as drawworks, pipe racks, mud pumps, etc.

In operation, platform 4 is positioned by conventional means such as by driving concrete piling and the like. The rig moving apparatus comprising the pontoons and yoke, having supported thereon the substructure which in turn supports the derrick and auxiliary equipment, is maneuvered about platform 4 to the correct location. The yoke is then lowered along the hydraulic jacks until the substructure 14 is positioned solidly on platform 4. The yoke is further lowered with respect to the pontoons until the substructure containing the derrick is disengaged from the yoke. The rig moving apparatus of the present invention is then maneuvered away from the platform containing the substructure and the derrick is ready for the drilling of a well borehole. If it is desired to remove the derrick and substructure from the platform, a reverse procedure from that outlined above is carried out.

Figure 2:
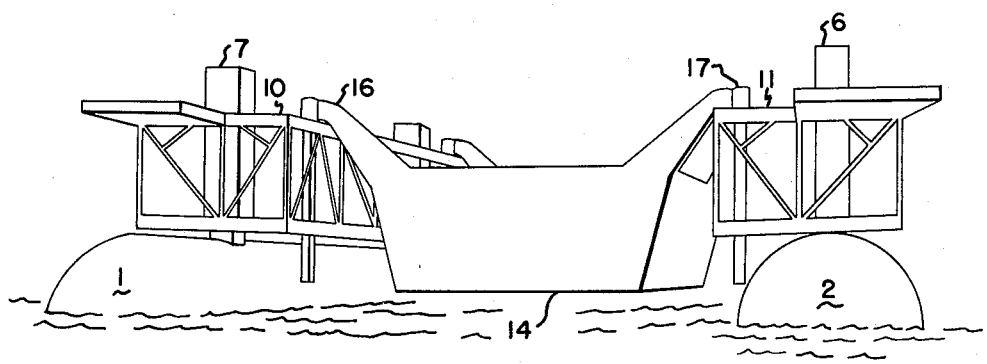
FIG. 2 is a front view of the essential elements showing the substructure positioned on the legs of the yoke.

Referring specifically to FIG. 2 the substructure 14 is shown positioned on legs 10 and 11 of the yoke. Hydraulic jacks 6 and 7 are also shown, which jacks along with jacks 5 and 8 elevate and lower the position of substructure 14 with respect to pontoons 1 and 2. Substructure 14 has attached thereto as integral parts upwardly and outwardly extending supporting arms 16, 17, 18 and 19 adapted to seat on the legs of the yoke.

Figure 3:
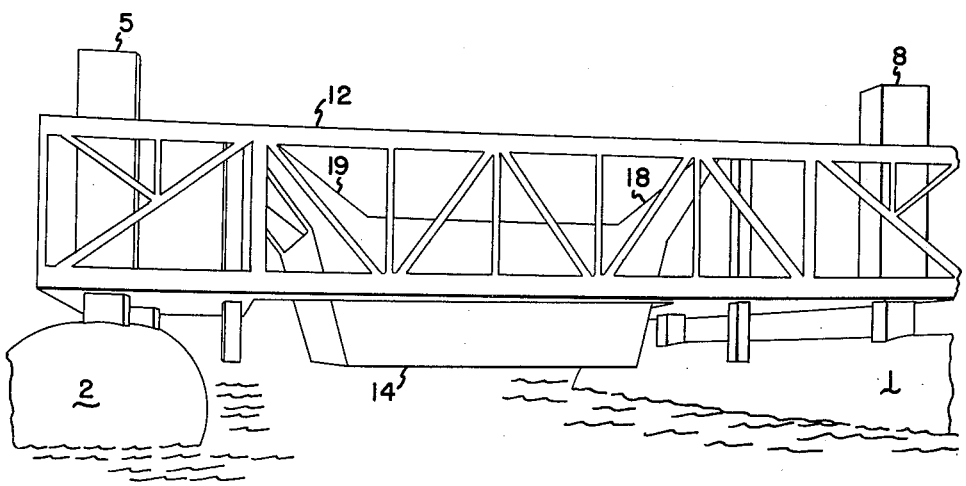
FIG. 3 is a view of the midsection of the yoke showing the same positioned on the pontoons.

Referring specifically to FIG. 3, midsection 12 of the yoke is shown positioned on jacks 5 and 8 attached to pontoons 2 and 1, respectively. Substructure 14 is shown supported on legs 10 and 11 of the yoke.

Figure 4:
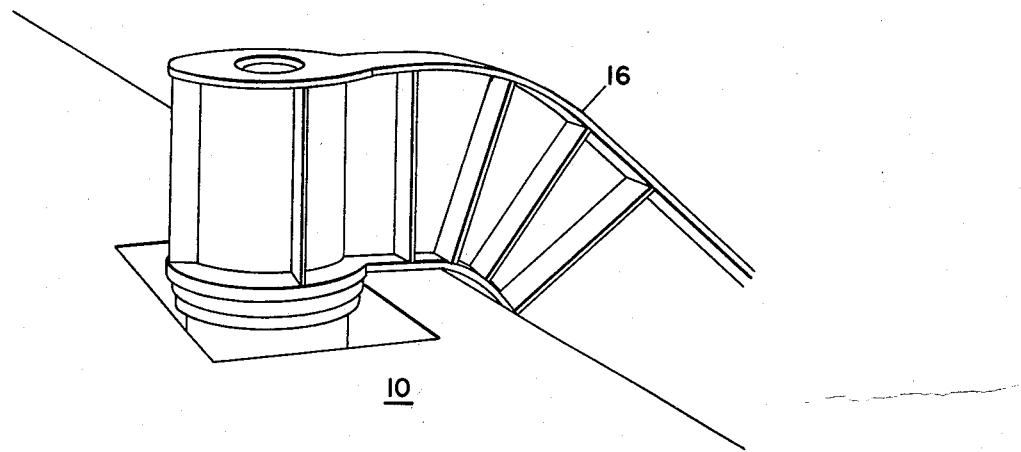
FIG. 4 is a detail showing the positioning of an arm of the substructure on a leg of the yoke.

Referring specifically to FIG. 4, a detail of the supporting arm 16 is shown supported on leg 10.

Figure 5:
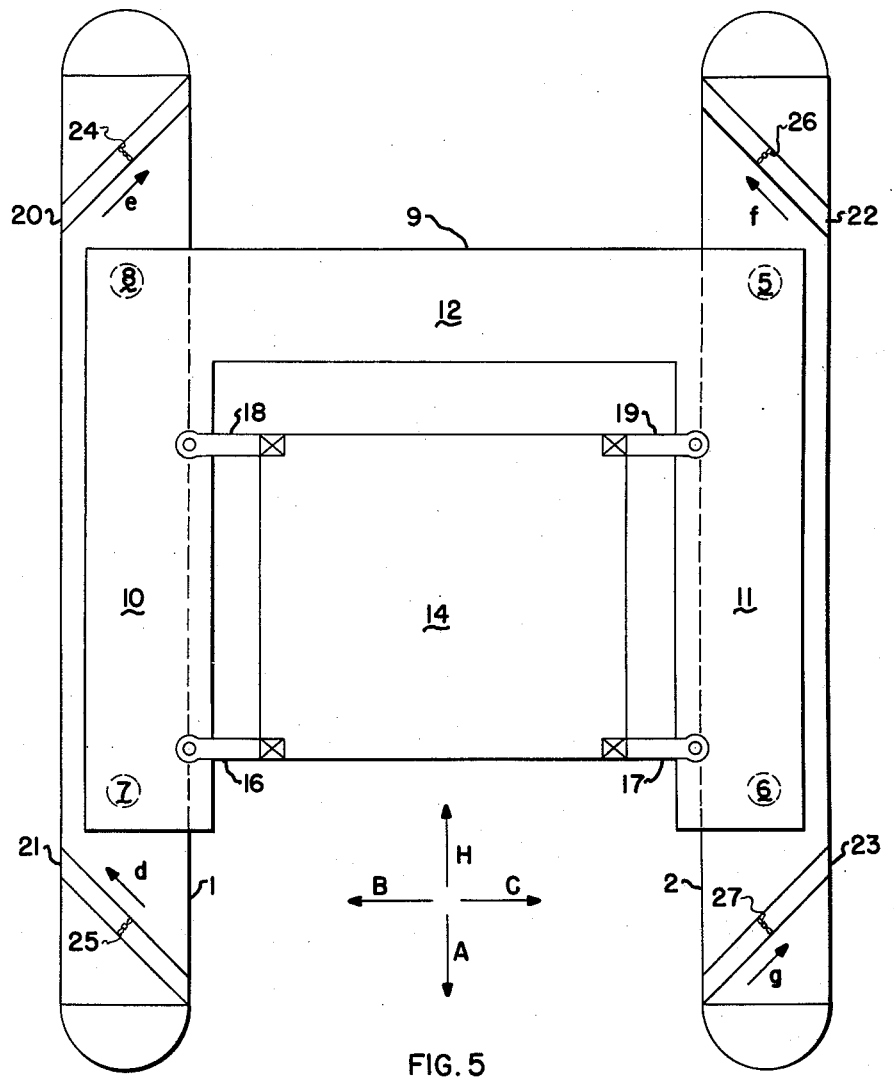
FIG. 5 is a top view of the apparatus with the substructure supported on the yoke. The derrick is not shown.

Referring specifically to FIG. 5, pontoons 1 and 2 are supporting yoke 9 consisting of leg elements 10 and 11 and the midsection 12. Hydraulic jacks 5, 6, 7 and 8 are shown which elevate and lower yoke 9 with respect to pontoons 1 and 2. Substructure 14 is shown suspended on legs 10 and 11 by means of arm supports 16, 17, 18 and 19. Pontoons 1 and 2 may be divided into any desired number of bulk head sections. Pontoon 1 is characterized by having a water channel 20 near one end thereof and a water channel 21 near the other end thereof. Pontoon 2 is characterized by having a water channel 22 therethrough at one end thereof and a water channel 23 at the other end thereof. The direction of these water channels should cross the center line of the pontoon at approximately 45°. In no instance should the angle be off more than 4 or 5°. The openings of these passageways on the inside of the pontoons should be nearest the ends of the pontoons as compared to the openings of the passageways on the outside of the pontoons. A propeller means 24 is positioned within water passage 20, a propeller means 25 within water passage 21, a propeller means 26 is positioned within water passage 22 and a propeller means 27 is positioned within water passage 23. These propeller means should be positioned approximately midway in the respective water passages.

In normal operation wherein it is desired to move the equipment in the direction illustrated by arrow $a$, propellers 24, 26, 27 and 25 would exert equal thrusts in the directions as shown by the arrows $d$, $e$, $f$ and $g$. The equipment would thus move forward. If it be desired to move the equipment in the direction as illustrated by arrow $h$, propellers 24, 25, 26 and 27 would exert equal thrusts in directions opposite from that as shown by arrows $d$, $e$, $f$ and $g$.

If it be desired to move the equipment in a direction as illustrated by arrow $c$, propellers 25 and 26 would exert equal thrusts in the direction as shown by the arrows $d$ and $f$, while propellers 27 and 24 would exert equal thrusts in directions opposite from that as shown by arrows $e$ and $g$. If it is desired to move the equipment in direction $b$ as illustrated by the arrow, propellers 24 and 27 would exert equal thrusts as shown by the arrows $e$ and $g$, while propellers 26 and 25 would exert equal thrusts in a direction opposite to that illustrated by arrows $d$ and $f$.

If it be desired to rotate the equipment clockwise, propellers 26 and 27 would exert thrusts as illustrated by arrows $f$ and $g$, while propellers 25 and 24 would exert thrusts in a direction opposite to that as illustrated by arrows $d$ and $e$. If on the other hand, it be desired to rotate the equipment counter-clockwise about a fixed point, propellers 24 and 25 would exert thrusts as shown by arrows $e$ and $d$, while propellers 26 and 27 would exert thrusts opposite to the direction illustrated by arrows $f$ and $g$.

From the foregoing, it is evident that by controlling the individual propellers both as to direction and as to the force of thrust, the equipment has complete maneuverability, which is very essential if the very heavy substructure with its derrick and auxiliary drilling equipment is to be accurately placed and positioned on the foundation. It is essential that the maneuverability and control be within a matter of inches.

Figure 6A:
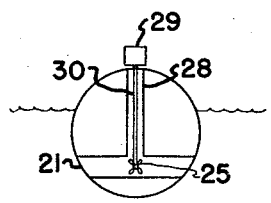
FIGS. 6A and 6B are end views of the pontoons 1 and 2 taken through section AA and section BB.
Figure 6B:
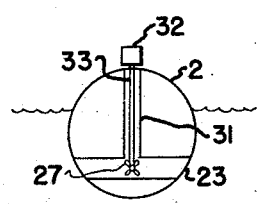

Referring specifically to FIG. 6A, water passage 21 and propeller 25 positioned in the front of pontoon 1 are shown. FIG. 6B shows water passage 23 and propeller means 27 positioned in the front end of pontoon 2. These water passages through the respective pontoons are positioned well below the center line of the respective pontoons. Generally speaking, they should be about in the lower quarter of the pontoon. Communicating with passage 21 is a vertical passage 28 which extends vertically upward from passage 21 and opens from the top of pontoon 1. Hydraulic motor 29 is positioned above the pontoon, which hydraulic motor by means of shaft 30 drives gear means and propeller 25. Similarly, a vertical passage 31 communicates with passage 23 and opens on the top of the pontoon. Hydraulic motor means 32 by means of shaft 33 drives propeller 27 through suitable gear means. Passages 22 and 20 are similarly constructed and propellers 24 and 26 similarly energized.

It is to be noted that the outer edge of leg 10 is within the outer edge of pontoon 1, and that the inner edge of leg 10 extends over the inner edge of pontoon 1. In a similar manner, the outer edge of leg 11 is within the outer edge of pontoon 2, while the inner edge of leg 11 extends over the inner edge of pontoon 2. By this structure, increased stability is secured and substructure 14 is rapidly positioned and detached when desired from the yoke assembly. Undesirable contact between pontoon-yoke and the substructure is thereby materially minimized.

Figure 7:
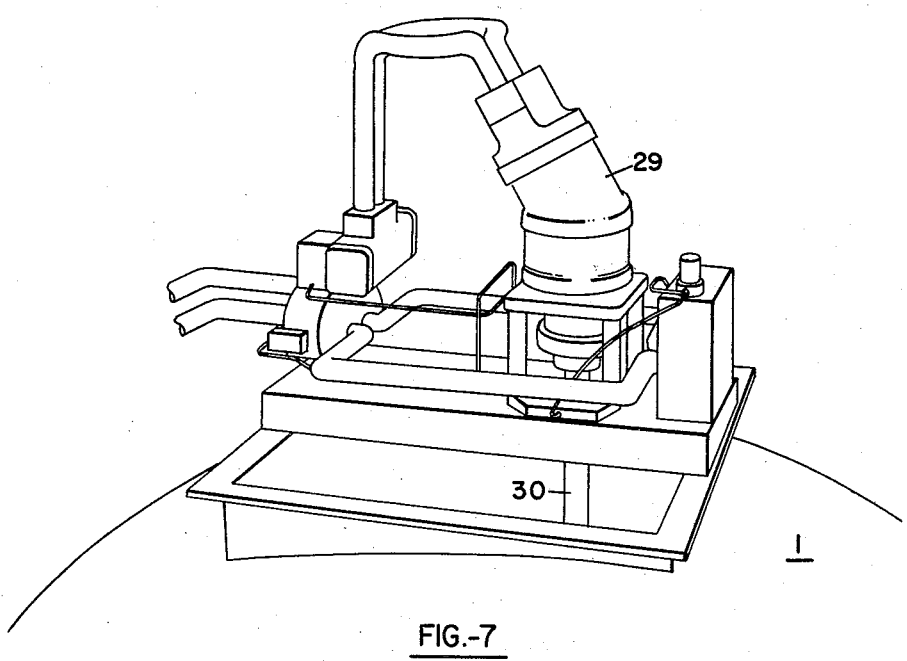
FIG. 7 illustrates in some detail the hydraulic motor positioned atop the pontoon for motivating the propeller in the water passage through a passageway extending from the top of the pontoon to said water passageway.

Referring specifically to FIG. 7, hydraulic motor 29 is shown positioned atop pontoon 1 by which said hydraulic motor 29 drives propeller 25 by means of shaft 30.

Figure 8:
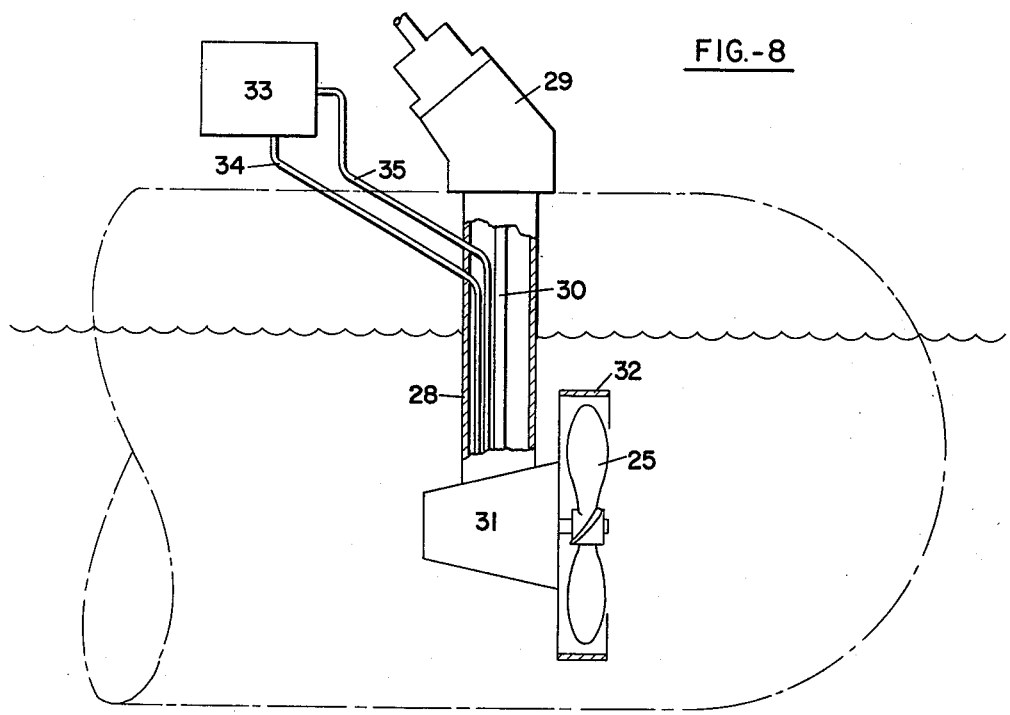
FIG. 8 illustrates in some detail the method of activating the propellers in the water passageways.

Referring specifically to FIG. 8, the propeller 25 is driven by hydraulic motor 29 through shaft 30 and a suitable gear box 31. Propeller 25 is protected by a suitable shroud 32. In accordance with a special adaptation of the present invention, an oil reservoir 33 is provided wherein oil is circulated to the gear box by means of line 34 and returned from the gear box by means of line 35. Means are provided to cool the returning oil by heat exchange with the water about the pontoon.

Figure 9:
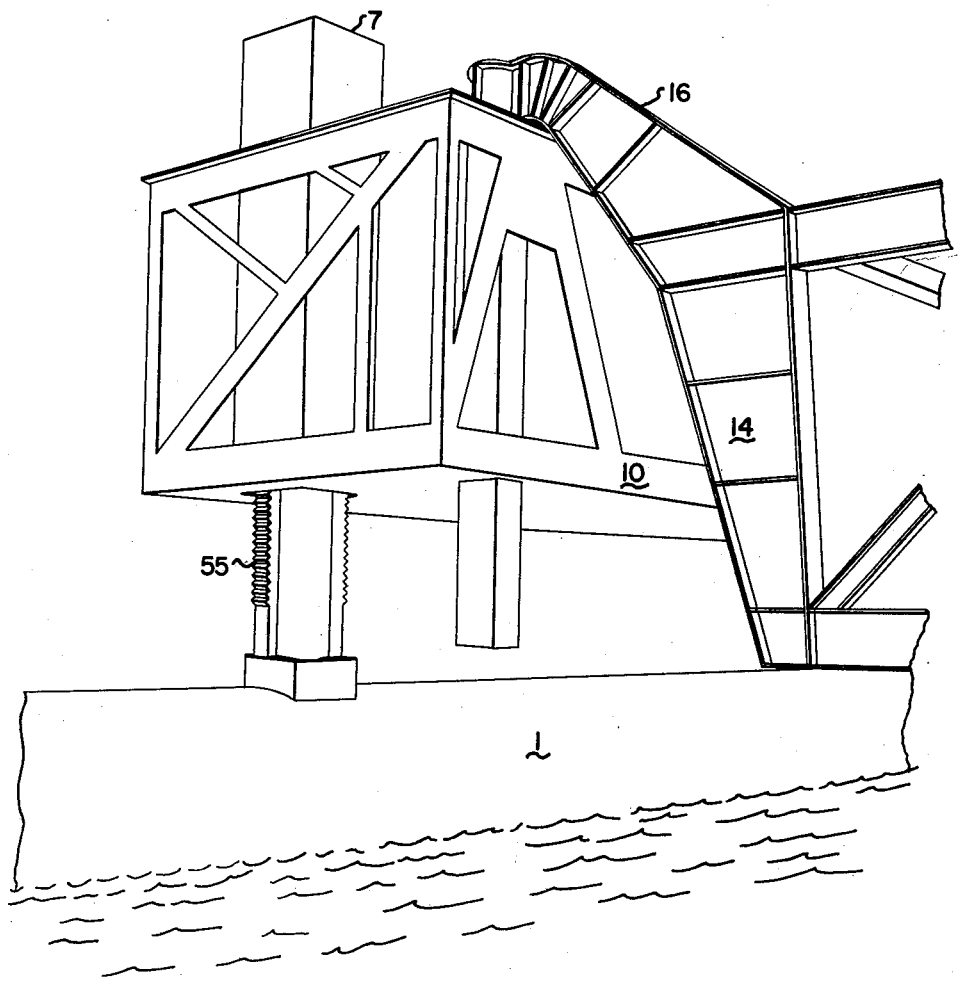
FIG. 9 illustrates in some detail the method of supporting the substructure on the yoke and the safety locking mechanism.

Referring specifically to FIG. 9, yoke 14 is shown supported by means of arm 16 on leg 10. It is to be noted that hydraulic jack 7 contains vertical safety latching means 35. The four jacks are similarly equipped.

Referring specifically to FIG. 10, diesel units 40, 41 and 42 drive hydraulic pumps 43, 44 and 45. The energy is utilized to drive hydraulic motors 29, 32, 36 and 37 which in turn drive the propellers in the water passages. The hydraulic pressure is also used to activate the hydraulic rams 5, 6, 7 and 8. In order to simplify the drawing, the manifolding is not shown. Suffice to say, the diesel pump units can be used to drive any piece of equipment and all units are completely interchangeable. Elements 50, 51, 52 and 53 illustrate four-way shut-off solenoid-operated valves. In essence, this permits each hydraulic motor 36, 37, 29 and 32 to be reversed.

Figure 10A:
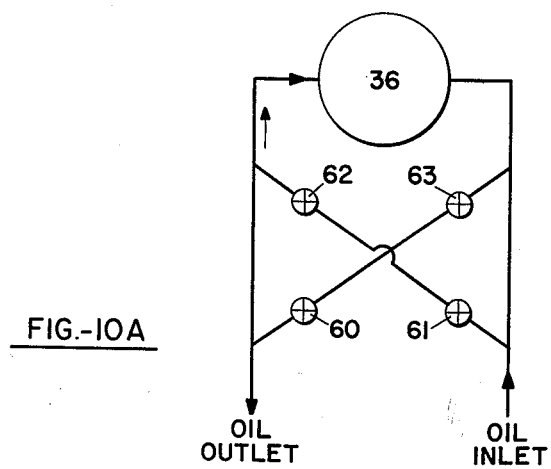
FIG. 10 illustrates, diagrammatically, the use of three diesel engine hydraulic pump units and the manifolding to the four hydraulic motors which motivate the equipment positioned in the pontoons and the four hydraulic rams which elevate or lower the yoke with respect to the pontoons. The operation is illustrated diagrammatically in FIG. 10A.

Referring to FIG. 10A, if its be desired to flow oil in the direction as illustrated by the arrow through hydraulic motor 36, then valves 60 and 61 are closed, while valves 62 and 63 are opened. If on the other hand, it is desired to flow oil in a direction different from that as shown by the arrow, then valves 60 and 61 are open, while valves 62 and 63 are closed.

While the particular dimensions vary appreciably, depending upon the load to be carried, the dimensions of an apparatus for carrying approximately 800 tons is as follows: each pontoon will be approximately 105 to 130 feet in length, preferably, about 115 feet. The diameter of the pontoon will approximate about 15 feet. The diameter of the water passages will be about four feet, the effective distance of lift of the hydraulic jacks will be 8 to 14 feet, preferably, about 10 feet. The center line of the water passages will preferably be about 2 to 3 feet below the longitudinal center line of the pontoons. These water passages will have an angle of 45° with respect to the longitudinal center line of the pontoons.

The cylindrical length of the pontoon will approximate 100 feet, while each semi-sphere end will have a length of about 7½ feet, thus making a total length of about 115 feet. The pontoons will be preferably compartmented into about 12 sections. The rear hydraulic rams will be about 23 feet from the end of the pontoon, while the forward hydraulic lifts will be set back about 23 feet from the forward end of the pontoon.

The yoke will have an overall length of about 74 feet and an overall width of about 73 feet. The distance between the respective legs will be about 43 feet. The width of each leg and of the midsection will be about 15 feet. Thus, the distance between the inner edge of the midsection in the end of each leg will approximate 59 feet. The longitudinal center line of each leg will be off-set about 4 feet from the longitudinal center lines of the respective pontoons. Thus, each leg will over-hang the respective pontoons by about 4 feet.

The rear hydraulic lifts will be positioned about 7½ feet from the rear of the midsection, while the front hydraulic rams will contact the yoke about 1½ feet from the end of each leg. The point of contact of the arms of the substructure on each leg will be about 5 feet from the inner edge of the midsection and about 5 feet from the end of each leg.

The substructure to be moved by the present apparatus will have a width of about 30 feet and an overall length of about 49½ feet. The span of the opposing arms for making contact with the respective legs will be about 46 feet.

As pointed out heretofore, the precise measurements will vary depending upon the weight and measurements of the substructure. However, the measurements do bear a certain ratio which should be followed.

What is claimed is:

1. Improved apparatus for moving a drilling rig from one marine location to another which comprises in combination with a substructure upon which said rig is positioned, two pontoons the longitudinal vertical planes of which are in parallel relationship with each other, said pontoons being spaced sufficiently apart to provide space for said substructure, each pontoon having as an integral part thereof two vertically extending hydraulic jacks, a yoke assembly consisting of two legs and a midsection, said assembly adapted to be moved upwardly and downwardly on said jacks, the vertical planes of said said legs of said yoke assembly being in parallel relationship with each other and with the vertical planes of said pontoons, the longitudinal vertical plane of said midsection of said yoke assembly being in perpendicular relationship to the vertical planes of said pontoons, and means for seating said substructure within said yoke on said legs.

2. Apparatus as defined by claim 1 wherein the inner surface of said legs over-extends the inner surface of said pontoons.

3. Apparatus as defined by claim 2 wherein said pontoons are characterized by having at each end thereof fluid passageways extending therethrough.

4. Apparatus as defined by claim 3 wherein there is positioned within said fluid passageways motivating means.

5. Apparatus as defined by claim 4 wherein said fluid passageways extending through said pontoons are positioned at an angle of approximately 45° with respect to the vertical planes of said pontoons.

6. Apparatus as defined by claim 5 wherein said passageways are characterized in that the openings of the same nearest the ends of said pontoons are on the inner surface of said pontoons.

7. Apparatus as defined by claim 6 wherein said passageways through said pontoons are positioned below the horizontal plane passing through the diameters of said pontoons.

8. Apparatus as defined by claim 1 wherein said means for seating said substructure within said yoke on said legs are upwardly and outwardly extending arm elements.

References Cited in the file of this patent

UNITED STATES PATENTS

| | | |
|---|---|---|
| 2,114,112 | Norquist | Apr. 12, 1938 |
| 2,330,674 | Briggs | Sept. 28, 1943 |
| 2,817,212 | Stubbs | Dec. 24, 1957 |
| 2,907,172 | Crake | Oct. 6, 1959 |

OTHER REFERENCES

Oil and Gas Journal of October 27, 1958, page 64.